United States Patent

[11] 3,629,882

[72] Inventor Edward P. Thorne
 Box G-D-4, 453 1st C.S.G.D, Homestead AFB, Homestead, Fla. 33030
[21] Appl. No. 10,336
[22] Filed Feb. 11, 1970
[45] Patented Dec. 28, 1971
 Original application Dec. 17, 1968, Ser. No. 784,345, now Patent No. 3,529,306.
 Divided and this application Feb. 11, 1970, Ser. No. 10,336

[54] ENERGY DISSIPATING SUPPORT DEVICE
 1 Claim, 8 Drawing Figs.
[52] U.S. Cl. .................................... 5/345,
 5/355, 5/361, 297/455
[51] Int. Cl. ........................................ A47c 27/00
[50] Field of Search............................ 5/246, 247,
 255, 345, 348, 351, 353, 361, 361 B, 355;
 297/216, 445, 455; 267/22, 33, 35; 2/2.5, 3

[56] References Cited
UNITED STATES PATENTS
2,141,271  12/1938  Gerlofson.................... 5/361 R
3,428,973  2/1969  Hargest et al................ 5/347

Primary Examiner—Bobby R. Gay
Assistant Examiner—Andrew M. Calvert
Attorneys—Harry A. Herbert, Jr. and Ruth G. Codier ABSTRACT: Small round pellets are confined in a given space. A series of closely fitted bars or shaped plunger units are placed in a pattern with ends flush against the pellets. The outer surface of the plungers is exposed and accepts the application of any force or blow applied thereto. Each plunger conveys its own shock to the adjacent area containing the pellets which in turn pass the shock uniformly and instantaneously to all other pellets. Each pellet absorbs an equal amount of shock and any remaining shock not wholly dissipated by the pellets is sent back in an outward force against the unaffected plunger bars.

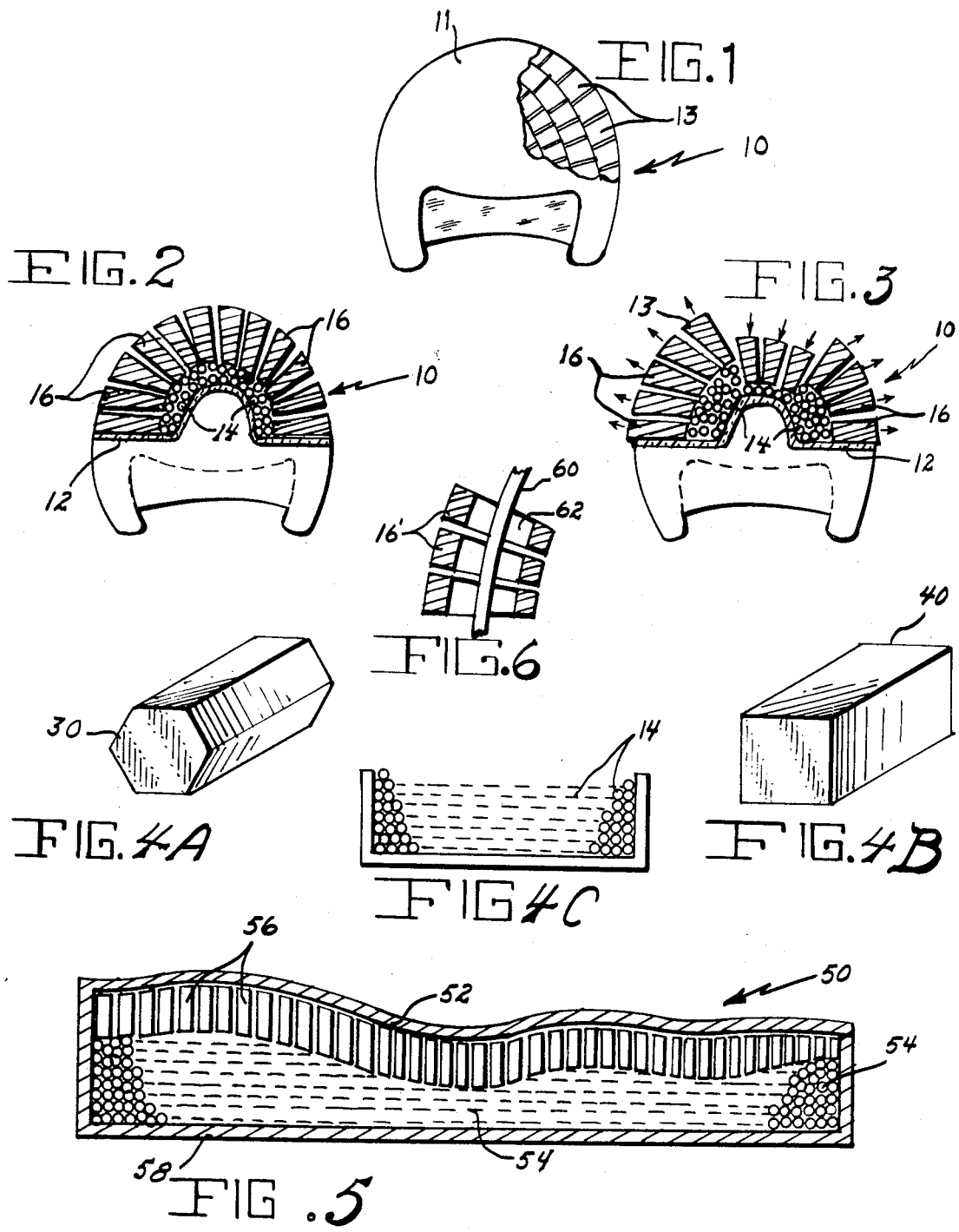

ENERGY DISSIPATING SUPPORT DEVICE

CROSS REFERENCE TO RELATED APPLICATION

This application is a division of application Ser. No. 784,345, filed Dec. 17, 1968 now U.S. Pat. No. 3,529,306.

BACKGROUND OF THE INVENTION

The invention relates to a new principle of absorbing shock and preventing damage to fragile materials subjected to blows and impacts of all sorts. The principle may be adapted to a long list of uses, both military and civilian, both in the field of safety and the field of comfort. Some are mentioned here but it will be readily perceived that the invention is not limited to these uses.
a. Crash helmets.
b. Cushioning equipment such as formfitting air or spacecraft seats, or formfitting garments.
c. Protective elements for interior of ground vehicles.
d. Exterior application for vehicles such as bumpers and devices for protection of elements against impact.
e. Landing equipment for space vehicles.
f. Equipment for facilitating hookup of space vehicles, and so on.
g. Mattresses, upholstered cushions.
h. Packaging of fragile equipment.

SUMMARY OF THE INVENTION

Solid round pellets which may be polystyrene of a suggested size of B—B shot are confined in large numbers. A series of shaped plunger units are arranged in a closely fitted pattern with inner ends flush against the pellets, and their outer surfaces placed to receive blows and impacts of various kinds. Each plunger is a flat-sided element capable of slidable motion in two directions with respect to each other. Each plunger reacts independently, except for variable frictional force between them which may be a planned or manufactured feature. A designed or built-in friction between the closely fitting bars would further provide resistance as desired.

To summarize briefly: the bars receiving the blow move inwardly while the remaining bars move outwardly in response to the kinetic energy imparted to the pellets resulting from the initial impact.

In the application of the invention to a crash helmet, the shock of a blow delivered against any part of the outer shell surface or exterior end of a plunger bar is conveyed immediately and directly to the pellets in the area adjacent its inward end. The first mass of pellets struck, in turn, passes the shock uniformly and instantaneously to all other pellets since the system simulates a fluid in a system of hydraulics, and cushions the blow by spreading it uniformly over the entire mass and directing the force outward away from the head of the person wearing the helmet.

Each pellet absorbs an equal amount of shock. Any remaining shock not wholly dissipated is directed outwardly against the inward surfaces of the plungers.

Solid polystyrene balls or pellets possess the proper characteristics which make them well suited for the purpose. It will be understood, however, that the invention is not limited to this material or to the B—B size of the pellets mentioned. The same consideration applies to the shape of the bar elements.

Polystyrene is extremely light in weight, has great tensile strength of the order of 5,000 to 9,000 p.s.i., and a compressive strength of 11,500 to 16,000 p.s.i. It has a very small plastic flow closely obeying Hooke's law. Because its dimensions remain essentially constant under loads, polystyrene can be used in applications where exact configuration must be maintained. The material does not distort.

Solid bars of vinyl or nylon have been found to provide the right characteristics. Hollow aluminum also has been found suitable. Both of these have the qualities of durability, light weight and tensile strength. The invention is not limited to any specific material nor to any specific shape. Configurations found suitable are units having square or hexagonal cross sections since the outer and inner surfaces present close fitting and uniform patterns for uniformly receiving exterior impact and uniformly flowing kinetic energy.

DESCRIPTION OF THE DRAWINGS

FIG. 1 is a fragmentary view of a crash helmet with a portion of the outer cover broken away to show the pattern of rod ends;

FIG. 2 is a view of the helmet in equilibrium and partly in cross section;

FIG. 3 is a view of the helmet partly in cross section showing an area under the influence of a blow and the reaction throughout the rest of the device;

FIGS. 4A and 4B show possible configurations of bar units;

FIG. 4C is a container of pellets;

FIG. 5 is an example of the use of the invention in a mattress; and

FIG. 6 shows a view of a possible expedient for confining the rods while allowing limited movement.

DESCRIPTION OF A PREFERRED EMBODIMENT

Referring more in detail to the drawings, reference numeral 10 indicates a crash helmet which is shown to illustrate the inventive principle and in no way limits its use. An inner wall or shield 12 fits a wearer's head and provides a container for confining a body of pellets 14. The wall 12 receives its portion of the dispersed energy and is of material such as hard rubber or metal to retain its original shape and further protect and the head.

The series of plunger elements 16 are closely fitted bars which are positioned in the case of the helmet and may be wedge-shaped to accommodate outwardly increasing diameter. The outer ends of these bars 16 from a pattern which conforms to the outside shape of the helmet 10. The inner ends form a pattern also and press against the body of loose pellets 14.

FIG. 3 shows the sequence of action and reaction. An impact or blow has been received in the area indicated by the inwardly pointing arrows. The plungers 16 in this area are depressed and kinetic energy is transmitted to the body of pellets 14.

Since the pellets 14 are not compressible, the kinetic energy is conveyed to the whole body of pellets and the bars 16 in the remaining portions of the helmet receive the impact equally and react outwardly as illustrated by the outwardly pointing arrows in FIG. 3.

The showing in the drawing is schematic, disclosing the principle. The methods of fabricating the helmet and retaining the bar elements in place are considered as obvious expedients designed in relation to the specific use. For example, an outer skin 11 of the helmet 10 may be fabricated of vinyl, rubber, fabric, rubberized fabric or any other suitable material.

FIGS. 4A and 4B are suggestive of the variety which is possible in the configuration of the plunger elements 16. FIG. 4A shows a plunger element 30, hexagonal in cross section, and FIG. 4B shows a rod 40 whose cross section is in the form of a square. Flat bars are necessary for fitting closely together, the ends presenting a relatively smooth surface on the outside where the shock energy is being transferred to the pellet body.

The many ways in which the invention is applicable has been mentioned above. FIG. 5 illustrated its use as applied to a mattress 50. The cover 52, a body of pellets 54 and a series of plunger elements 56, operate on the principle described above, allowing the mattress to accommodate to body contours and provide a new type of comfort.

Many expedients are possible for confining the plunger elements and the pellets, while allowing for their movement as dictated by the principle and function of the invention. In FIG. 1, a cover 11 confines the whole structure and receives its portion of the blow, transmitting it to the rod ends 13. This cover may be vinyl, or any other material possessing the required characteristics.

In FIG. 5, a suitable mattress cover 52 and box container 58 keep the pellets 54 and the plunger elements confined in operational arrangement.

FIG. 6 shows a wire or fiber rod 60, threaded through slots 62 provided in the rods 16'.

Although the invention has been described with reference to the particular embodiment, it will be understood to those skilled in the art that the invention is capable of a variety of alternative embodiments within the spirit and scope of the appended claims.

I claim:

1. In a mattress including a containing structure of rigid bottom and side members and a flexible top member, a body of spherical pellets capable of resisting distortion filling the lower portion of said containing structure, a series of elongated plunger elements located side by side in frictional contact and capable of independent sliding motion with respect to each other immediately beneath the flexible top member in the upper portion of the containing structure, the lower end of said elongated plunger elements and the upper surface of said body of spherical pellets being in operational contact, energy being conveyed through said plunger elements to said body of pellets where it is conveyed uniformly throughout said body of pellets to move said plunger elements downward or upward to conform to body contours.

* * * * *